Jan. 28, 1969     M. PASNAK ET AL     3,424,007
PRESSURE AND DEPTH DETECTOR
Filed April 27, 1967

Michael Pasnak
Donald W. Ernst
INVENTORS

BY J.O. Tresansky
ATTORNEY

H.R. Booher
AGENT

# United States Patent Office 3,424,007
Patented Jan. 28, 1969

3,424,007
PRESSURE AND DEPTH DETECTOR
Michael Pasnak, 17408 Astoria Lane 20904, and Donald W. Ernst, 8709 Carroll Ave. 20903, both of Silver Spring, Md.
Filed Apr. 27, 1967, Ser. No. 635,330
U.S. Cl. 73—398                                    1 Claim
Int. Cl. G01l 9/16

ABSTRACT OF THE DISCLOSURE

A hydrostatic pressure detector having a ferrimagnetic toroid core sensing element directly sensitive to changes in hydrostatic pressure. A primary winding on the core biases the sensor into a desired detecting range and a secondary winding detects changes in inductive reactance corresponding to changes in the surrounding hydrostatic pressure.

Background of the invention

This invention relates to pressure transducers and more specifically to pressure transducers for directly converting hydrostatic pressure changes to electrical signals.

Pressure transducers for use in hydrostatic measuring instruments are well known in the art. Normally, hydrostatic transducers may be considered as either magnetic transducers or those which rely upon some principle other than magnetism. The latter usually require the use of mechanical components such as bellows, diaphragms, Bourdon tubes, and/or electrical components like variable resistance, capacitance or inductance. Non-magnetic transducers, although satisfactory for many applications are not satisfactory for deep sea measurements because they either lack desired sensitivities, are limited in operation range, require elaborate associated instrumentation, or must be housed in heavy bulky containers for protection against severe pressures found at great water depths.

There are two main types of pressure transducers which rely on magnetic principles; those which use bellows or diaphragms to produce motion proportional to the differential pressure applied to them and transducers in the form of transformers. Magnetic transducers with induced motion vary the position of a magnetic core which produces a change in the inductance or mutual inductance of a coil.

The present invention is related to the pressure transducers which take the form of transformers. In the past, transformer transducers in eliminating the motion aspect have relied upon the magnetic properties of ferromagnetic materials which are extremely sensitive to mechanical stresses. In these devices an A-C signal is applied to the primary winding of the transformer to magnetize the core to a peak flux level. The change in flux with time from the A-C excitation induces a voltage in the secondary winding. When the core is subjected to mechanical stress such as tension, compression or shear, its peak flux level changes providing an induced voltage in the secondary winding which is proportional to pressure. The primary difficulty with the prior art transformer transducers, however, is the fact that they are not directly sensitive to hydrostatic pressures. They require containers which protect the ferromagnetic core from hydrostatic pressures and additional means for converting hydrostatic pressures to mechanical stresses before application to the core. There has been a long existing need therefore for a hydrostatic pressure transducer which is directly responsive to hydrostatic pressures, which is simple and inexpensive to make, and which is sensitive and reliable at great water depths such as found in the ocean.

Summary of the invention

The general purpose of the present invention is to provide a simple, accurate, and inexpensive means of measuring both hydrostatic pressure and depth in a hydrostatic medium.

It is an object of the present invention to overcome the disadvantages and limitations of prior art hydrostatic transducer by providing a new and improved ferrimagnetic transformer transducer.

It is also an object to provide a new pressure transducer which is directly responsive to hydrostatic pressures.

The above and other objects are attained by a novel hydrostatic transducer for use as a pressure sensing element in a wide variety of underwater applications having a ferrimagnetic hydrostatic sensing core with primary and secondary windings exposed to a fluid medium. Hydrostatic pressures exert a force on the hydrostatic fluid medium and the ferrimagnetic core converts fluid pressure changes into corresponding electrical signals. The present device is therefore directly responsive to hydrostatic pressures in either liquid, gaseous, or solid mediums.

Brief description of the drawings

The foregoing and other objects, features and attendant advantages of the invention will be readily appreciated as the same becomes better understood by the accompanying drawing wherein.

Description of the preferred embodiment

Figure 1:
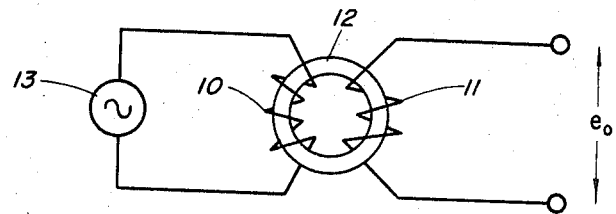
FIG. 1 is a schematic illustration of the pressure sensor of the invention.

The invention is shown generally in FIG. 1 wherein a toriod core 12 has an A-C excitation signal 13 applied over primary winding 10 and an output signal detected by secondary winding 11. The core 12 is composed of ferrimagnetic material whose magnetic properties are sensitive to changes in hydrostatic pressure of a surrounding fluid medium. Examples of ferrimagnetic material which are suitable for this purpose are ferrites such as manganese-zinc ferrite, nickel-zinc ferrite, magnesium-manganese ferrite, lithium ferrite, and the like.

Figure 2:
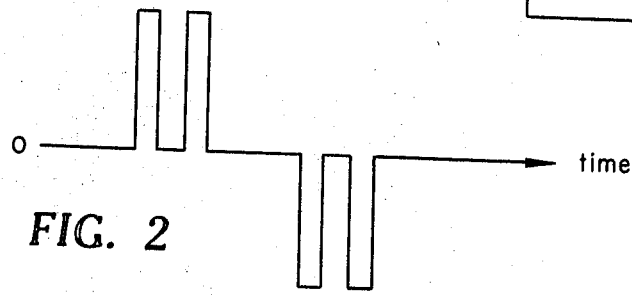
FIG. 2 is a view of a pulse train which may be used for excitation of a ferrimagnetic core.

When the ferrite core 12 is biased by an excitation signal such as that shown in FIG. 2 an output voltage appears at the terminals of the secondary winding 11. If the pressure sensing element 12 is then subjected to a hydrostatic pressure, the magnetic flux inside the core 12 either increases or decreases depending on the composition of the ferrimagnetic core. The change in flux produces a corresponding change in output voltage $e_o$. The sensitivity, that is, change in $e_o$ per unit change in pressure, is a function of both the magnetizing current in primary winding 10 and the ferrimagnetic material. The degree of linearity for the pressure sensing element varies depending on the ferrite core material, the shape of the core material's hystersis loop, and the magnitude of the magnetizing field. With manganese-zinc ferrite sensing element, for example, the output voltage was found to decrease to approximately 20 percent of its value with a pressure increase from zero to 7000 bars.

For depth detecting purposes the device may be extremely small in size, since toroidal ferrite cores are available as small as .030 inch in outside diameter with a thickness of .015 inch. The weight of the core including its primary and secondary winding, adds up to approximately .15 gram. Although the embodiment shown in FIG. 1 requires no housing for protection against severe hydrostatic pressures, a thimble size, perforated enclosure is contemplated to protect the core from possible collision with debris in the water.

Figure 3:
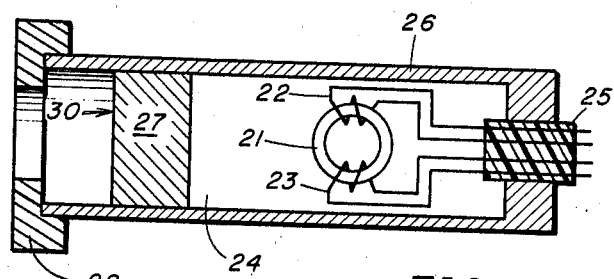
FIG. 3 is a view partially in section, illustrating an embodiment of the invention with the pressure sensor housed in a container.

FIG. 3 shows another embodiment of the invention which may be used either as a depth detector or as an accelerometer.

The ferrimagnetic core 21 has primary and secondary windings 22 and 23 housed in a fluid 24 which is at a predetermined pressure. The leads of the windings are brought out through plug 25 which is inserted in container 26. A free moving mass 27 fits inside container 26 and is prevented from leaving the container by stop 28. If the device is used as an accelerometer, the entire unit is attached to an object capable of motion. As the object is accelerated in the direction of the arrow 29, the movable mass 27 compresses the fluid 24 causing an increase in fluid pressure bearing on the ferrimagnetic core 21. The change in fluid pressure causes the magnetic flux in core 21 to change, thereby producing a change in the voltage appearing across the secondary winding. The change in the secondary voltage can be used to measure the acceleration as a function of the fluid pressure within container 26. When used as a pressure and depth detector, a component of hydrostatic force 30 acts on the face of the mass 27 causing it to compress the fluid 24. The results of this action are then the same as described in regard to FIG. 1.

Figure 4:
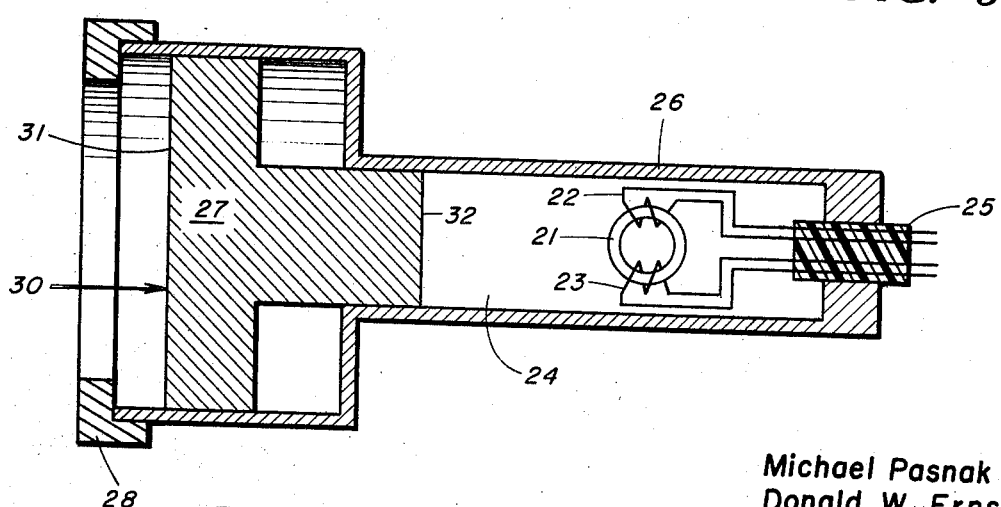
FIG. 4 is a view, partially in section, illustrating another embodiment of the invention having pressure amplification.

FIG. 4 shows still another embodiment of the invention which may be used either as an accelerometer or as a depth detector. The operation and components are the same as described in the embodiment of FIG. 3 except the container 26 and mass 27 have been enlarged at one end to provide pressure amplification. If a pressure 30 is applied to face 31 of mass 27, face 32 transmits an amplified pressure to fluid 24. The amount of amplification is a factor equal to the ratio of the area of face 31 to the area of face 32. Consequently, a small application of pressure 30 is sensed by the core 21 as a large change in pressure, producing a large voltage change across the secondary winding.

The device eliminates stress conversion means in pressure transducers by being directly responsive to hydrostatic pressures. It does not limit instrument sensitivity at deep water pressures, requires no elaborate housing containers, and has a minimum of moving parts. The pressure transducer of the invention has a wide variety of applications. The simplicity of the device enables it to be used as an underwater pressure sensor without sacrificing sensitivity in numerous applications. For example, it may be used as a depth detector aboard submarines or surface vessels or it can be used to activate auxiliary and firing circuits in mines and depth charges.

Another potential use is to study undersea currents and depths by incorporating it as a tuning element in a miniature radio transmitter. In this application the sensing core requires only one winding. The transmitter can be thrown into the water and as it descends the pressure will change the inductive reactance of the pressure sensing element causing a change in the transmitted frequency. With the frequency calibrated as a function of pressure, transmission of the signal will give both the depth and position of the signal. In addition to depth measurements, the invention is also readily useable as an accelerometer.

From the foregoing it will now be apparent that a new and improved pressure transducer has been developed which has uses in many and varied applications. It should be understood of course that the embodiments disclosed are merely illustrative and are not intended to limit the scope of the invention. For example, a toroid core is shown in the embodiments, but the shape of the core is not considered critical. Any configuration of ferrimagnetic material would probably be suitable. The wave shape or the sequence of pulses of the excitation signal need not be limited to that shown in FIG. 2. It may just as well be sinusoidal, square, saw-tooth or the like. Reference should be made to the appended claim, therefore rather than the specification as indicating the scope of the invention.

What is new and desired to be secured by Letters Patent of the United States is:

1. A hydrostatic pressure transducer for converting hydrostatic pressure signals to electrical signals comprising:
   a ferrimagnetic core sensitive in its active state to fluid pressure changes;
   a primary winding wound on said core and having an excitation signal applied thereto for normally biasing said core into said active state;
   a secondary winding wound on said core for deriving an electrical output signal from said core, said output signal changing as a function of changes in the hydrostatic pressure acting upon said core;
   a fluid surrounding said core and said first and second windings;
   a single movable mass having a first surface in contact with said fluid and a second larger surface integrally connected to said first surface and exposable to environmental hydrostatic pressures;
   housing means enclosing said mass and said fluid, said housing means having an opening in the vicinity of the mass' exposable surface whereby environmental forces act upon said mass to compress the fluid surrounding said core so that the electrical output signal in the second winding of said core changes in accordance with the pressure changes generated by the forces acting on the movable mass and whereby said second larger surface amplifies the forces acting on said movable mass.

References Cited

UNITED STATES PATENTS

| | | | |
|---|---|---|---|
| 2,481,651 | 9/1949 | Fitzpatrick | 73—395 |
| 2,718,145 | 9/1955 | Nisle | 73—301 |
| 3,307,405 | 3/1967 | Stucki | 73—398 |
| 3,332,287 | 7/1967 | Amen | 73—419 |

S. CLEMENT SWISHER, *Primary Examiner.*

D. O. WOODIEL, *Assistant Examiner.*

U.S. Cl. X.R.

73—419